United States Patent [19]
Ward

[11] 3,830,112
[45] Aug. 20, 1974

[54] COMBINED CRANKSHAFT AND FLYWHEEL ASSEMBLY FOR VARIABLE SPEED POWER TRANSMISSION

[75] Inventor: Harry M. Ward, Waukegan, Ill.

[73] Assignee: Outboard Marine Corporation, Waukegan, Ill.

[22] Filed: Dec. 11, 1972

[21] Appl. No.: 313,988

[52] U.S. Cl.................. 74/230.17 E, 192/105 C
[51] Int. Cl............................................. F16h 55/52
[58] Field of Search.............. 74/230.17 E, 572; 192/105 B, 105 C, 70

[56] References Cited
UNITED STATES PATENTS

| | | | |
|---|---|---|---|
| 1,936,737 | 12/1933 | Tingley | 74/572 |
| 2,239,568 | 4/1941 | Newton | 192/105 B |
| 2,613,784 | 10/1952 | Chilton | 192/105 B |

FOREIGN PATENTS OR APPLICATIONS

| | | | |
|---|---|---|---|
| 866,550 | 12/1961 | Great Britain | 192/105 B |
| 2,013,519 | 6/1970 | Germany | 192/105 B |

*Primary Examiner*—Charles J. Myhre
*Assistant Examiner*—R. H. Lazarus
*Attorney, Agent, or Firm*—Michael, Best & Friedrich

[57] ABSTRACT

Disclosed herein is a crankshaft for an internal combustion engine including, at one end, a unitary drive shaft portion which carries and drives the fixed and axially movable sheave members of a variable speed V-belt power transmission. Also disclosed herein is a flywheel assembly for an internal combustion engine having an inclined face and arranged on a drive shaft in a manner such that it also functions as the fixed sheave member of a variable speed V-belt power transmission.

5 Claims, 2 Drawing Figures

PATENTED AUG 20 1974 3,830,112

3,830,112

COMBINED CRANKSHAFT AND FLYWHEEL ASSEMBLY FOR VARIABLE SPEED POWER TRANSMISSION

BACKGROUND OF THE INVENTION

This invention relates to power transmissions and, more particularly, to variable speed V-belt transmissions. This invention also relates to a crankshaft and flywheel assembly for internal combustion engines driving such variable speed transmissions.

Variable speed, V-belt transmissions are used quite extensively in all-terrain vehicles, golf carts, small trucks, and snowmobiles. In the past, transmissions of this type have included a fixed sheave member or flange forming one half of the transmission belt drive sheave and an axially movable sheave member or flange forming the other half of the drive sheave, both of which were mounted on a separate drive shaft coupled to the engine crankshaft for common rotary movement. Problems with obtaining accurate concentricity between this coupled drive shaft and the engine have often occurred.

Internal combustion engines typically used to drive such power transmissions included a flywheel carrying various components for starting and operating the engine and for providing inertia. The flywheel was mounted on the engine crankshaft adjacent to the engine block, either on the end opposite to the fixed sheave member or on the same end as the fixed sheave member and positioned between the engine block and the fixed sheave member. Use of a separate fixed sheave member adds cost, weight, and inertia.

SUMMARY OF THE INVENTION

The invention provides a crankshaft for an internal combustion engine having, on one end, a unitary drive shaft portion which carries and drives the fixed and axially movable sheave members of a variable speed V-belt power transmission, thereby eliminating a separate transmission drive shaft and the problems associated therewith.

The invention also provides a flywheel assembly which is arranged with an inclined face and is positioned on the drive shaft for a variable speed V-belt power transmission to also operate as the fixed sheave member of the transmission assembly. The flywheel assembly and the axially movable sheave member forming the other half of the transmission drive sheave are preferably mounted on the unitary drive shaft portion of a crankshaft arranged in accordance with the invention.

An object of this invention is to provide means for driving a variable speed V-belt power transmission so as to eliminate a separate drive shaft carrying the fixed and axially movable sheave members forming the transmission belt drive sheave.

Another object of this invention is to provide a crankshaft for an internal combustion engine which is arranged to be capable of acting as the drive shaft of the sheave members of a variable speed V-belt power transmission.

A further object of this invention is to provide a variable speed V-belt power transmission for an internal combustion engine in which a separate flywheel assembly and a separate fixed sheave member is eliminated.

A still further ojbect of this invention is to provide a flywheel assembly for an internal combustion engine which is arranged in a manner to be capable of functioning as a fixed sheave member of a variable speed V-belt power transmission.

Other objects and advantages of this invention will become apparent from the following description and accompanying drawings.

DESCRIPTION OF THE PREFERRED EMBODIMENT

Figure 2:
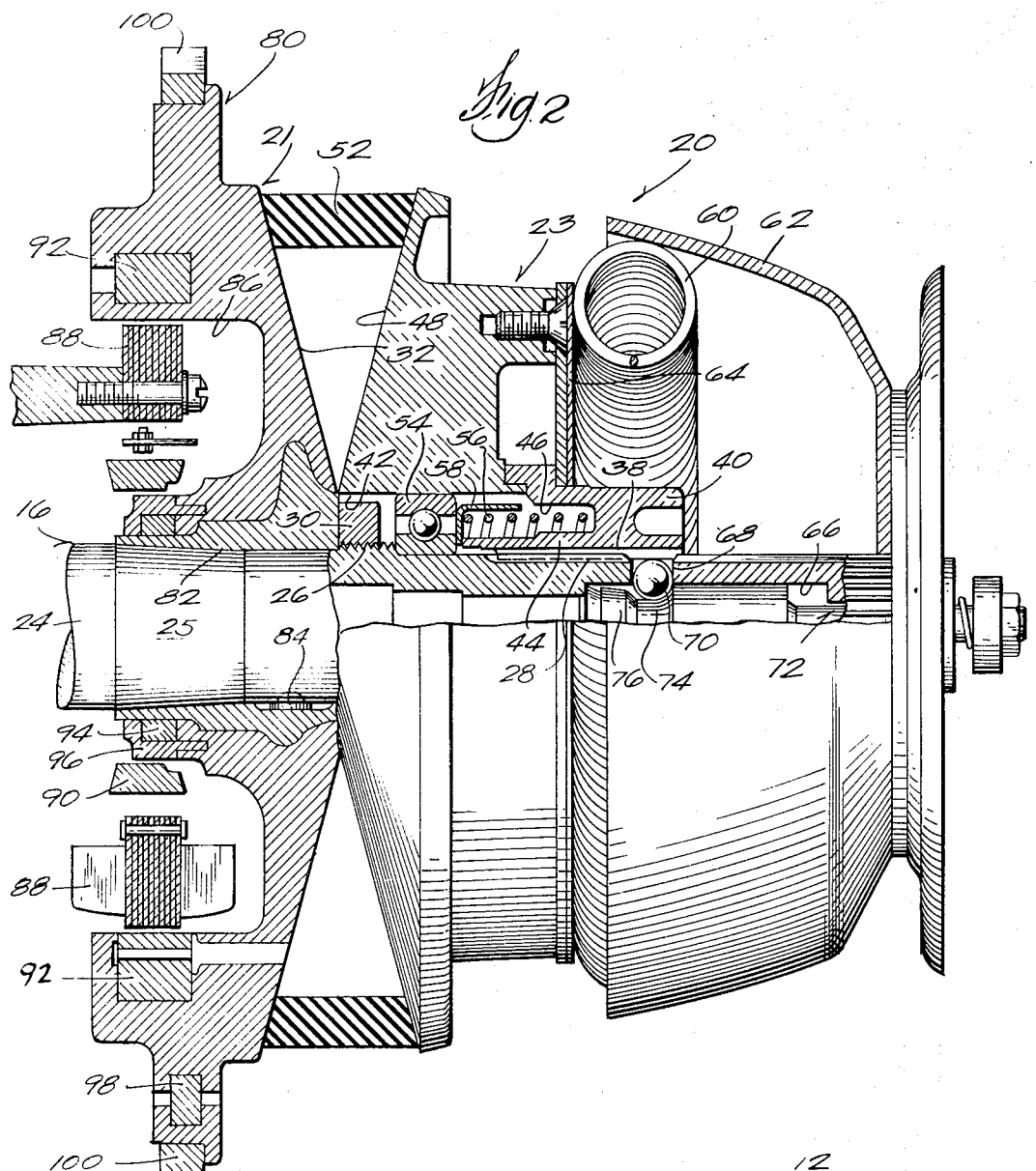
FIG. 2 is an enlarged, partially sectioned, side elevational view of the flywheel and power transmission assemblies illustrated in FIG. 1.

Before explaining the invention in detail, it is to be understood that the invention is not limited in its application to details of construction and arrangement of components set forth in the following description or illustrated in the drawing. The invention is capable of other embodiments and of being practiced and carried out in various ways. Also, it is to be understood that the phraseology or terminology employed herein is for the purposes of description and should not be regarded as limiting.

Figure 1:
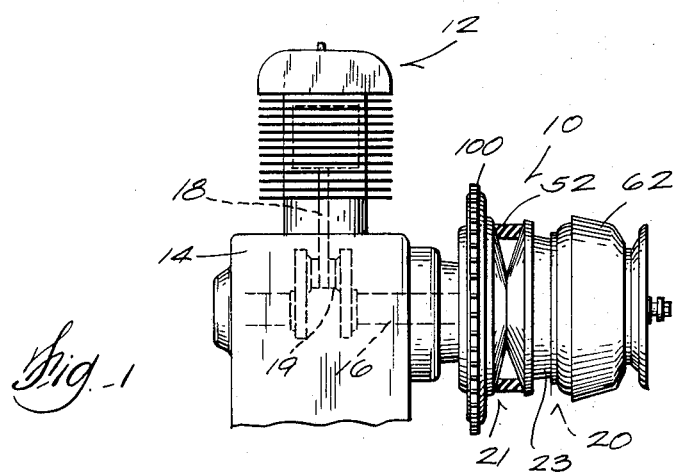
FIG. 1 is a partial side elevational view of an internal combustion engine including a flywheel assembly and a power transmission assembly embodying various of the features of this invention.

FIG. 1 illustrates an engine power transmission system 10 embodying various of the features of this invention, which system includes an internal combustion engine 12 having a block 14, a piston means 18 located in the engine 12, a crankshaft 16 suitably journaled in the engine block 14 with one end extending outwardly therefrom and including suitable means, such as crankpin 19, for connection to the piston means 18, and a variable speed V-belt power transmission assembly 20 carried on the extending end of the crankshaft 16 for common rotary movement.

The power transmission assembly 20 includes a fixed sheave member 21 and an axially movable sheave member 23. While other constructions can be employed, in the construction illustrated in FIG. 2, the sheave members 21 and 23 are arranged and operate in substantially the same manner described in copending U.S. application Ser. No. 179,320, filed on Sept. 10, 1971 and assigned to the assignee of the present application, which co-pending application is incorporated herein by reference.

As described in the above identified co-pending application Ser. No. 179,320, the fixed sheave member 21 and the axially movable sheave member 23 are carried on a power input shaft which is connected to a suitable power source. In accordance with this invention, the engine crankshaft 16 includes, on the end extending from the engine block 14, a unitary drive shaft portion 24 which acts as the power input or drive shaft for the fixed sheave member 21 and the axially movable sheave member 23.

The drive shaft portion 24 of the crankshaft 16 includes a shank portion 25, an externally threaded portion 26, and an externally splined portion 28. The fixed sheave member 21 is rotationally affixed to the shank portion 25, is axially held in place on the shank portion 25 by a retainer nut 30 threaded onto the threaded portion 26, and includes an inclined flange 32 extending radially from the shank portion 25.

The movable sheave member 23 includes an internally splined portion 38 which is received by and engaged on the splined portion 28 of the drive shaft portion 24 so that the movable sheave member 23 is carried by the crankshaft 16 for common rotary movement and for axial movement relative to the fixed sheave member 21. The movable sheave member 23 also includes a hub 40 having a recess 42 which accommodates the retainer nut 30 and a sleeve 44 which extends towards the fixed sheave member 21 (i.e., to the left as viewed in FIG. 2) and defines an annular pocket 46 which is open in the direction of the fixed sheave member 21.

Extending from the hub 40 for common movement therewith is a radially inclined flange 48 which is located in facing relation to the flange 32 of the fixed sheave member 21. The flange 48, together with the movable sheave member 23 as a whole, is movable relative to the fixed sheave member 21 between a drive position adjacent to the fixed sheave member 21 as shown in FIG. 2, and a neutral or spaced position located remotely from the fixed sheave member 21 (i.e. moved to the right as viewed in FIG. 2).

When the movable sheave member 23 is in the drive position shown in FIG. 2, the power transmission assembly 20 is in a driving condition with the flanges 32 and 48 in the driving engagement with a transmission belt 52. When the movable sheave member 23 is in the spaced or neutral position, the transmission belt 52 rides on a bearing 54 carried on the drive shaft portion 24 adjacent to the retainer nut 30.

The movable sheave member 23 is biased toward the neutral or spaced positioned by a helical compression spring 56 which is located with one end seated in the annular pocket 46 and the other end seated against a spring stop 58 extending from the drive shaft portion 24 adjacent to the bearing 54. The movable sheave member 23 is urged toward the drive position in response to rotation of the crankshaft 16 by a garter spring 60 which encircles the hub 40 and which, in response to the rotation of the movable sheave member 23, moves radially outwardly by centrifugal force. As the garter spring 60 moves radially in response to rotation of the crankshaft 16, it engages a spring retainer or housing 62 which is fixed to the drive shaft portion 24. The housing 62 is arranged to cause the garter spring 60 to be displaced towards the fixed sheave member 21 and to drivingly engage a portion 64 of the movable sheave member 23 so as to displace the movable sheave towards a drive position.

As described in the above identified co-pending application Ser. No. 179,320, the power transmission assembly 20 can include a blocking means for releasably preventing movement of the movable sheave member 23 from the neutral position to a drive position until high rotational speeds are obtained. Thereafter, the movable sheave member 23 automatically moves rapidly from the neutral position to the drive position to thereby provide a snap-in clutch action.

While various constructions can be employed, the construction of the blocking means generally illustrated in FIG. 2 is substantially the same as that shown in FIG. 3 of the above identified co-pending application Ser. No. 179,320 and includes an axial bore 66 in the drive shaft portion 24, at least one, and preferably a series of, radial apertures or bores 68 extending outwardly from the axial bore 66, and balls 70 located in the radial apertures 68 which act as blocking elements. The balls 70 are movable between blocking positions, extending partially outwardly from the radial apertures 68 to block movement of the movable sheave member 23 from the neutral position to a drive position, and retracted positions within the radial apertures 68 so as to permit free movement of the movable sheave member 23 towards a drive position.

The blocking means also includes a plunger 72 slidably positioned within the axial bore 66 and having a recessed portion 74 into which the balls 70 are received when in their retracted positions. The plunger 72 also includes an inner end portion 76 inwardly spaced from the recessed portion 74.

The plunger 72 is movable in the axial bore 66 between a withdrawn or blocking position with the inner end portion 76 radially aligned with and in engagement with the balls 70 to locate them in their blocking positions and an inserted or released position (as shown in FIG. 2) with the recessed portion 74 located in radial alignment with the balls 70 permitting them to move to their retracted position so that the movable sheave member 23 can move axially to the drive position.

From the foregoing description, it can be appreciated that, by arranging the crankshaft according to this invention with a unitary drive shaft portion on one end acting as the drive shaft for the fixed and movable sheave members, the number of parts is reduced with a resultant reduction in machining requirements and the task of obtaining accurate concentricity between the engine and the rotary parts is substantially simplified.

Thus far, one embodiment of the invention has been described wherein the fixed sheave member 21 can be constructed in a conventional manner, such as described in the above-identified co-pending application Ser. No. 179,320. Also, in accordance with this invention, the flywheel assembly for the internal combustion engine is arranged and positioned on a drive shaft in a manner such that it also operates as the fixed sheave member 21 for the power transmission assembly 20. With such a construction the added cost, weight, and inertia associated with the use of a separate fixed sheave member are eliminated.

While various constructions can be employed, in the construction illustrated in FIG. 2, the flywheel 80 includes a central hub 82 received by the shank portion 25 of the drive shaft portion 24 which is located adjacent to the engine block 14 and an inclined face 32 extending radially outwardly from the hub 82 and corresponding to the flange 32 which acts as the driving surface of the fixed sheave member 21 as described above. The flywheel 80 is rotationally affixed to the shank portion 25 by a key 84, which fits into circumferentially alignable key ways provided on the exterior of the shank portion 25 and the interior of the hub 82, and is axially held in place on the shank portion 25 by the retainer nut 30 which is threaded onto the threaded portion 26 as described above.

With exception of the radially inclined face 32, which acts as the transmission belt driving surface of the fixed sheave member 21 for the power transmission assembly 20, the flywheel 80 can be constructed in a onventional manner and can include various electrical components for the starting, the ignition, and the operation of the engine and for charging the engine battery, and one or more counterweights to aid in dynamically and statically balancing the engine. A suitable arrangement of the various electrical components and associated circuitry is described in co-pending U.S. application Ser. No. 179,768, filed on Sept. 13, 1971, and assigned to the assignee of the present application, which co-pending application is incorporated herein by reference.

For example, in the construction illustrated in FIG. 2, the flywheel 80 includes an annular groove or recess 86 which is open toward the engine block 14. Suitably mounted on the engine block 14 and located in the annular recess 86 are a pair of diametrically opposed charge coils 88 and an ignition coil 90, both of which are suitably connected into the engine electrical system. The engine electrical system is conventionally arranged and does not constitute part of the invention. Therefore, illustration and a detailed description of the engine electrical system have been omitted for the sake of brevity.

The charge coils 88 are located in close proximity to a plurality of circumferentially spaced pole shoe and magnet assemblies 92 located on the flywheel 80 and cooperate therewith, during rotation of the flywheel 80, to charge the alternators (not shown) of the engine electrical system. The ignition coil 90 is located relative to the rotary path of an ignition magnet 94 which is mounted on the flywheel 80 adjacent to the hub 82, and cooperates therewith during rotation of the flywheel 80 to generate an ignition signal. An annular pole shoe 96 is located on the flywheel 80 adjacent to the ignition magnet 94 and is operable to concentrate the flux between the ignition magnet 94 and ignition coil 90.

An arcuate counterweight 98 located on the flywheel 80 radially outwardly from the hub 82 is provided to aid in balancing the engine.

As shown in FIG. 2, the flywheel 80 can include a ring gear 100 which is located on the periphery of the flywheel and which meshes with the gear of an automatic engine starting mechanism (not shown). When a manual starting means is used, such as a pull rope (not shown), the ring gear 100 can be omitted.

Although the flywheel 80 is illustrated and described in conjunction with a crankshaft arranged according to this invention, it should be appreciated that a flywheel arranged according to this invention so that it can also operate as a fixed sheave of a variable speed V-belt power transmission can also be used with transmission systems employing a conventional separate drive shaft coupled to the engine crankshaft.

Various of the features of the invention are set forth in the following claims.

I claim:

1. Power transmitting apparatus comprising an engine, a crankshaft rotatably supported by said engine, a flywheel assembly carrying electrical components for operating said engine, fixed to said crankshaft and having a radially inclined face adapted to drivingly engage an endless output member having a V-shaped cross section, a movable member including a flange having a radially inclined face adapted to engage the endless output member and slidably mounted on said crankshaft with said inclined faces of said movable member and said flywheel assembly in facing relationship and for axial movement of said movable member on said crankshaft between a spaced position and an adjacent position relative to said flywheel assembly, biasing means urging said movable member toward said spaced position to provide a neutral drive condition, and means operable, in response to the rotation of said crankshaft, for overpowering said biasing means and for moving said movable member to said adjacent position to provide a power transmitting condition.

2. Power transmitting apparatus according to claim 1 wherein said crankshaft includes a shank portion carrying said flywheel assembly and an externally splined portion and wherein said movable member has a splined portion slidably engaged with said splined crankshaft portion.

3. Power transmitting apparatus according to claim 2 and further including a threaded portion on said crankshaft adjacent to said shank portion, and a retaining means threaded onto said threaded portion for retaining said flywheel assembly against axial movement relative to said crankshaft.

4. Power transmitting apparatus comprising an engine, a crankshaft rotatably supported by said engine, a circular flywheel member fixed to said crankshaft having a radially inclined face adapted to engage an endless output member having a V-shaped cross section, and having thereon a ring gear, a movable member including a flange having a radially inclined face adapted to engage the endless output member and slidably mounted on said crankshaft with said inclined faces of said movable member and said circular member in facing relationship and for axial movement of said movable member on said crankshaft between a spaced position and an adjacent position relative to said circular member, biasing means urging said movable member toward said spaced position to provide a neutral drive condition, and means operable, in response to the rotation of said crankshaft, for overpowering said biasing means and for moving said movable member to said adjacent position to provide a power transmitting condition.

5. Power transmitting apparatus comprising an engine, a crankshaft rotatably supported by said engine, a flywheel fixed to said crankshaft and having a radially inclined face adapted to drivingly engage an endless output member having a V-shaped cross section, a movable member including a flange having a radially inclined face adapted to engage the endless output member and slidably mounted on said crankshaft with said inclined faces of said movable member and said flywheel in facing relationship and for axial movement of said movable member on said crankshaft between a spaced position and an adjacent position relative to said flywheel, biasing means urging said movable member toward said spaced position to provide a neutral drive condition, and means operable, in response to the rotation of said crankshaft, for overpowering said biasing means and for moving said movable member to said adjacent position to provide a power transmitting condition.

* * * * *